US012786617B2

(12) United States Patent
Chon et al.

(10) Patent No.: US 12,786,617 B2

(45) Date of Patent: Nov. 3, 2026

(54) SPEAKER MODULE AND DISPLAY DEVICE INCLUDING THE SAME

(71) Applicant: LG ELECTRONICS INC., Seoul (KR)

(72) Inventors: Ha Young Chon, Seoul (KR); Sung Eun Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 499 days.

(21) Appl. No.: 18/224,790

(22) Filed: Jul. 21, 2023

(65) Prior Publication Data

US 2024/0397257 A1 Nov. 28, 2024

(30) Foreign Application Priority Data

May 22, 2023 (KR) ........................ 10-2023-0065435

(51) Int. Cl.
*H04R 1/32* (2006.01)

(52) U.S. Cl.
CPC .................................... *H04R 1/323* (2013.01)

(58) Field of Classification Search
CPC .... H04R 1/323; H04R 1/345; H04R 2499/15; H04R 1/24; H04R 27/00
See application file for complete search history.

(56) References Cited

U.S. PATENT DOCUMENTS

| | | | | |
|---|---|---|---|---|
| 2019/0281383 | A1* | 9/2019 | Shigihara | G10K 11/025 |
| 2024/0196123 | A1* | 6/2024 | Huo | H04N 21/43 |
| 2024/0397257 | A1* | 11/2024 | Chon | H04R 1/323 |

FOREIGN PATENT DOCUMENTS

| | | | | |
|---|---|---|---|---|
| JP | 2008072400 | A * | 3/2008 | |
| JP | 2008-79179 | A | 4/2008 | |
| KR | 20-0124868 | Y1 | 10/1998 | |
| KR | 10-2014-0010834 | A | 1/2014 | |
| KR | 10-2020-0084514 | A | 7/2020 | |
| KR | 10-2021-0101701 | A | 8/2021 | |
| WO | WO-2021029682 | A1 * | 2/2021 | H04R 5/04 |

* cited by examiner

*Primary Examiner* — Carolyn R Edwards
*Assistant Examiner* — Julie X Dang
(74) *Attorney, Agent, or Firm* — Birch, Stewart, Kolasch & Birch, LLP

(57) ABSTRACT

Disclosed herein are a speaker module capable of providing left and right sound balance and a sound field enhancement effect, and a display device including the same. The speaker module comprises a support plate, a sound output unit fixed on an upper surface of the support plate, a guide plate disposed on an upper surface of the support plate and having formed therein a sound flow path for guiding an output direction of sound output from the sound output unit, and a cover plate covering the sound flow path. A plurality of sound flow paths is formed in an outward direction of the support plate centered on the sound output unit.

15 Claims, 25 Drawing Sheets

SPEAKER MODULE AND DISPLAY DEVICE INCLUDING THE SAME

CROSS-REFERENCE TO RELATED APPLICATIONS

Pursuant to 35 U.S.C. § 119(a), this application claims the benefit of earlier filing date and right of priority to Korean Patent Application No. 10-2023-0065435, filed on May 22, 2023, the contents of which are all hereby incorporated by reference herein in its entirety.

FIELD

The present disclosure relates to a speaker module capable of providing left and right sound balance and a sound field enhancement effect, and a display device including the same.

BACKGROUND

In general, a display device is a device having a function of receiving, processing, and displaying an image that a user can view. The display device receives a broadcast signal selected by a user among broadcast signals transmitted from a broadcasting station, separates a video signal from the received signal, and displays the separated video signal on a display.

Recently, with the development of broadcasting technology and network technology, the functions of display devices have been considerably diversified, and the performance of the devices has been improved accordingly. That is, display devices have evolved to provide users with various other content as well as simply broadcast content.

Meanwhile, in the display device, a speaker for outputting sound may be disposed, and a plurality of speakers may be disposed to enhance a sound field effect.

For example, in the display device, speakers may be disposed on the side and top surfaces, respectively, to enhance the sound field to the left, right, and top.

However, since existing speakers have a structure in which each speaker may radiate sound in only one direction, the number of speakers needs to be increased in order for the display device to enhance a sound field in a desired direction.

As such, as the number of speakers increases, material costs increase, which becomes a factor in increasing product prices.

Therefore, in the future, it is necessary to develop a speaker module capable of radiating sound in various directions and a display device capable of enhancing a sound field effect with a small number of speaker modules.

SUMMARY

The present disclosure aims to solve the above problems and other problems.

An object of the present disclosure is to provide a speaker module capable of radiating sound output from one speaker in a plurality of directions by forming a plurality of sound flow paths in one speaker module and enhancing a sound field effect without increasing the number of speakers and a display device including the same.

A speaker module according to an embodiment of the present disclosure may comprise a support plate, a sound output unit fixed on an upper surface of the support plate, a guide plate disposed on an upper surface of the support plate and having formed therein a sound flow path for guiding an output direction of sound output from the sound output unit, and a cover plate covering the sound flow path. A plurality of sound flow paths may be formed in an outward direction of the support plate centered on the sound output unit.

A display device according to an embodiment of the present disclosure may comprise a speaker module, a display configure to display content, and a processor configured to control sound output of the speaker module. The speaker module may comprise a support plate, a sound output unit fixed on an upper surface of the support plate, a guide plate disposed on an upper surface of the support plate and having formed therein a sound flow path for guiding an output direction of sound output from the sound output unit, and a cover plate covering the sound flow path. A plurality of sound flow paths may be formed in an outward direction of the support plate centered on the sound output unit.

DETAILED DESCRIPTION OF THE PREFERRED EMBODIMENTS

Reference will now be made in detail to the preferred embodiments of the present disclosure, examples of which are illustrated in the accompanying drawings. The suffixes "module" and "unit" of elements herein are used for convenience of description and thus can be used interchangeably and do not have any distinguishable meanings or functions. In describing the embodiments disclosed herein, if it is determined that the detailed description of a related known technology renders the scope of the present disclosure unnecessarily ambiguous, the detailed description thereof will be omitted. The accompanying drawings are used to help easily understand the embodiments disclosed herein, the technical idea disclosed herein is not limited by the accompanying drawings, and the present disclosure should be construed to include all alterations, equivalents and substitutes included in the sprit and technical scope of the present disclosure.

While terms including ordinal numbers such as 'first', 'second', etc. may be used to describe various components, the components are not limited by the terms. These terms may be used to distinguish one component from another component.

When it is said that a component is 'coupled with/to' or 'connected to' another component, it should be understood that the one component is connected to the other component directly or through any other component in between. On the other hand, when it is said that a component is 'directly connected to' or 'directly coupled to' another component, it should be understood that there is no other component between the components.

Figure 1:
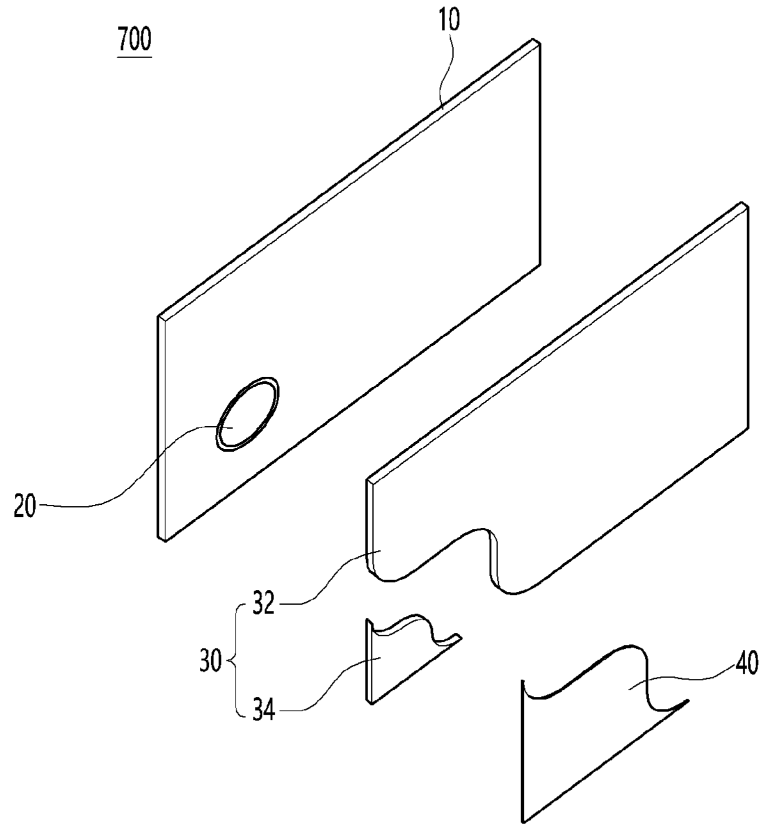
FIGS. 1 to 3 are diagrams illustrating a speaker module according to an embodiment of the present disclosure.
Figure 2:
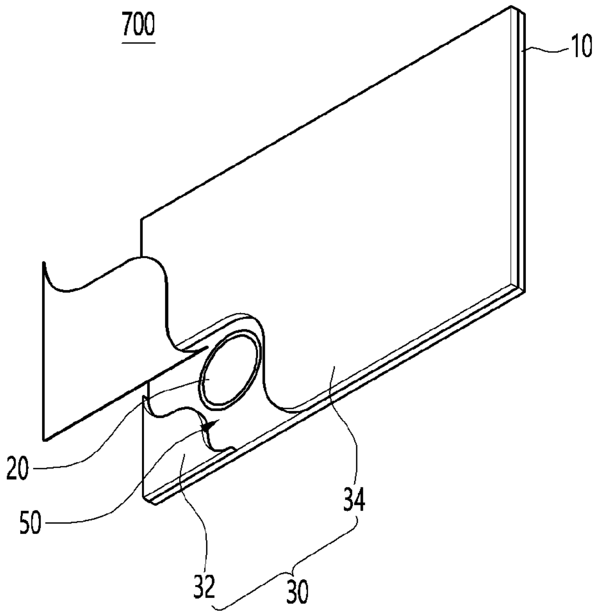
Figure 3:
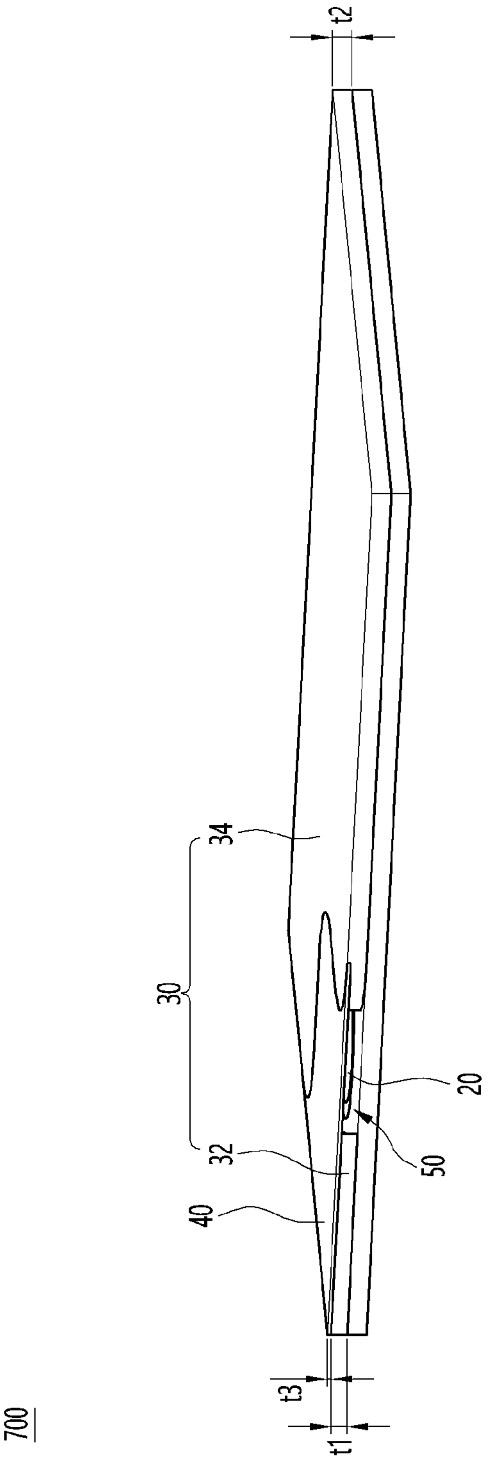

FIGS. 1 to 3 are diagrams illustrating a speaker module according to an embodiment of the present disclosure.

As shown in FIGS. 1 to 3, the speaker module 700 of the present disclosure may include a support plate 10, a sound output unit 20, a guide plate 30 and a cover plate 40.

Here, the support plate 10 may be a speak box back case in which the sound output unit 20, which is a speaker, is mounted.

Also, a mounting hole or a mounting groove in which the sound output unit 20 will be mounted may be formed in the support plate 10.

Subsequently, the sound output unit 20, as a speaker for outputting sound, may be fixed on an upper surface of the support plate 10.

For example, the sound output unit 20 may be disposed in at least one of a central region or a corner region of the support plate 10.

Here, at least one sound output unit 20 may be disposed on one support plate 10.

Next, the guide plate 3 may be a speak box front case, and is disposed on an upper surface of the support plate 10, and may have formed therein a sound flow path 50 for guiding the output direction of sound output from the sound output unit 20.

Here, a plurality of sound flow paths 50 may be formed in an outward direction of the support plate 10 centered on the sound output unit 20.

In addition, the guide plate 30 may include a plurality of sound flow paths 50, and the upper surface of the support plate 10 may be exposed in a region in which the sound flow path 50 is formed.

Here, the upper surface of the support plate 10 exposed by the sound flow path 50 may have a flat surface.

In some cases, the upper surface of the support plate 10 exposed by the sound flow path 50 may have an inclined surface.

For example, the inclined surface of the support plate 10 may be inclined along the sound flow path 50 in an outward direction of the support plate 10 from the sound output unit 20.

The reason is to increase the sound field effect by gradually increasing the sound radiation space formed along the sound flow path 50.

In this case, the support plate 10 having an inclined surface may be thicker as it is closer to the sound output unit and thinner as it is further away from the sound output unit 20.

In addition, the guide plate 30 includes a sound blocking unit 34 disposed in one region of the support plate 10 based on the sound output unit 20 to block sound directed in one direction, and a sound flow path separator 32 disposed in the other region of the support plate 10 with respect to the sound output unit 20 to separate the sound flow path.

Here, the sound blocking unit 34 is disposed spaced apart from the sound output unit 20 and the sound flow path separator 32, and the shape of the side of the sound blocking unit 34 may vary according to the shape of the side of the sound output unit 20.

For example, the shape of the side of the sound blocking unit 34 may have a curved surface or a flat shape according to the shape of the side of the sound output unit 20.

As another example, the sound blocking unit 34 and the sound flow path separator 32 may have sides facing the sound output unit 20 formed in at least one of a curved shape or a flat shape.

The shapes of the sides of the sound blocking unit 34 and the sound flow path separator 32 may be a factor in determining a sound radiation path and a sound field range.

Therefore, the present disclosure may optimize the sound radiation path and the sound field range by optimally designing the shapes of the sides of the sound blocking unit 34 and the sound flow path separator 32 in consideration of the sound output mode of the display device in which the speaker module is mounted.

Also, the sound flow path separator 32 may be disposed spaced apart from the sound output unit 20 and the sound blocking unit 34, and may be disposed to face the side of the sound blocking unit 34.

Here, the number of sound flow path separators 32 may be determined by an equation of $N=n-1$ (where N is the number of sound flow path separators and n is the number of sound flow paths).

Subsequently, a distance between the sound flow path separator 32 and the sound blocking unit 34 may be maintained at the same distance in the outward direction of the support plate 10 from the sound output unit 20.

In some cases, the distance between the sound flow path separator 32 and the sound blocking unit 34 may gradually increase in the outward direction of the support plate 10 from the sound output unit 20.

Also, the sound flow path separator 32 may be located in at least one of a central region or a corner region of one edge of the support plate 10.

Also, the sound flow path separator 32 and the sound blocking unit 34 may have the same thickness.

In some cases, the sound flow path separator 32 and the sound blocking unit 34 may have different thicknesses.

Here, the thickness t1 of the sound flow path separator 32 may be thinner than the thickness t2 of the sound blocking unit 34.

Subsequently, the sound flow path separator 32 may be covered by the cover plate 40.

Here, the thickness t3 of the cover plate 40 may be thinner than the thickness t1 of the sound flow path separator 32 and the thickness t2 of the sound blocking unit 34.

For example, a sum of the thickness t3 of the cover plate 40 and the thickness t1 of the sound flow path separator 32 may be equal to the thickness t2 of the sound blocking unit 34.

Next, in the guide plate 30, a first sound flow path and a second sound flow path having different directions may be formed.

Here, the first sound flow path may be formed in a left diagonal direction of one side of the support plate 10 from the sound output unit 20, and the second sound flow path may be formed in a right diagonal direction of one side of the support plate 10 from the sound output unit 20.

In this case, the first sound flow path and the second sound flow path may have the same length and be arranged symmetrically with each other with respect to the sound output unit 20.

Also, the area of the first sound flow path may be the same as that of the second sound flow path.

In some cases, in the guide plate 30, the first sound flow path, the second sound flow path, and the third sound flow path having different directions may be formed.

Here, the first sound flow path may be formed in a first lateral direction of the support plate 10 from the sound output unit 20, and the second sound flow path may be formed in a second lateral direction of the support plate 10, which is opposite to the first lateral direction of the support plate 10, from the sound output unit 20 and the third sound flow path may be formed in a third lateral direction of the support plate 10, which is perpendicular to the direction of the first lateral direction or second lateral direction of the support plate 10, from the sound output unit 20.

At this time, the first sound flow path and the second sound flow path have the same length and are arranged symmetrically with each other with respect to the sound output unit 20, and a third sound flow path may have a length different from that of the first sound flow path or the second sound flow path.

For example, the length of the third sound flow path may be shorter than that of the first sound flow path or the second sound flow path.

Also, the areas of the first sound flow path and the second sound flow path may be the same, and the area of the third sound flow path may be different from that of the first sound flow path or the second sound flow path.

For example, the area of the third sound flow path may be smaller than that of the first sound flow path or the second sound flow path.

Next, the cover plate 40 may cover the sound output unit 20 and the sound flow path 50.

Here, the cover plate 40 may cover the entire region of the sound flow path 50 or only a part of the sound flow path 50.

Also, the cover plate 40 may cover the sound output unit 20, the sound flow path 50, and the sound flow path separator 32 of the guide plate 30.

Here, the cover plate 40 may cover the entire region of the sound flow path 50 or only a part of the sound flow path 50.

Subsequently, the cover plate 40 may include a metal material.

The reason is that the cover plate 40 serves to protect the sound output unit 20 from external impact and at the same time may reflect the sound output from the sound output unit 20 to the sound flow path 50 without loss.

Next, the cover plate 40 may be fastened to come into contact with the side surface of the guide plate 30 to cover the sound flow path 50.

In some cases, the cover plate 40 may be fastened to the guide plate 30 so as to cover both the sound output unit 20 and the sound flow path 50, or may be separated from the guide plate 30 so that both the sound output unit 20 and the sound flow path 50 are exposed.

In another case, the cover plate 40 may be fastened to the guide plate 30 to cover all of the sound output unit 20 and partially cover the sound flow path 50, or may be separated from the guide plate 30 so that both the sound output unit 20 and the sound flow path 50 are exposed.

As such, in the present disclosure, by forming a plurality of sound flow paths in one speaker module, it is possible to radiate sound output from one speaker in a plurality of directions, thereby enhancing the sound field effect without increasing the number of speakers.

Figure 4:
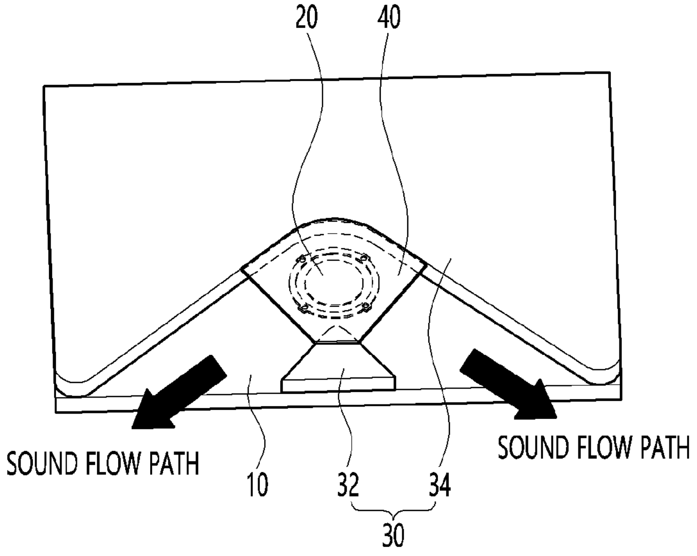
FIGS. 4 and 5 are diagrams illustrating a speaker module according to another embodiment of the present disclosure.
Figure 5:
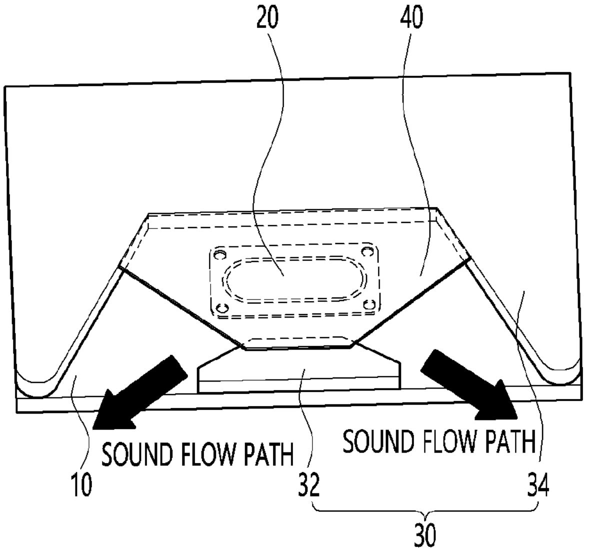

FIGS. 4 and 5 are diagrams illustrating a speaker module according to another embodiment of the present disclosure.

As shown in FIGS. 4 and 5, the speaker module of the present disclosure may include a support plate 10, a sound output unit 20 fixed on an upper surface of the support plate 10, a guide plate 30 disposed on an upper surface of the support plate 20 and having formed therein two sound flow paths for guiding the output direction of sound output from the sound output unit 20, and a cover plate 40 covering the sound output unit 20 and the sound flow path.

Here, two sound flow paths may be formed in the outward direction of the support plate 10 centered on the sound output unit 20.

For example, in the guide plate 30, a first sound flow path and a second sound flow path having different directions may be formed.

Here, the first sound flow path may be formed in a left diagonal direction of one side of the support plate 10 from the sound output unit 20, and the second sound flow path may be formed in a right diagonal direction of one side of the support plate 10 from the sound output unit 20.

In this case, the first sound flow path and the second sound flow path may have the same length and be arranged symmetrically with each other with respect to the sound output unit 20.

Also, the area of the first sound flow path may be the same as that of the second sound flow path.

In addition, the guide plate 30 includes a sound blocking unit 34 disposed in one region of the support plate 10 based on the sound output unit 20 to block sound directed in one direction, and a sound flow path separator 32 disposed in the other region of the support plate 10 based on the sound output unit 20 to separate the sound flow path.

Here, the sound blocking unit 34 is disposed spaced apart from the sound output unit 20 and the sound flow path separator 32, and the shape of the side of the sound blocking unit 34 may vary according to the shape of the side of the sound output unit 20.

Also, the sound flow path separator 32 may be disposed spaced apart from the sound output unit 20 and the sound blocking unit 34, and may be disposed to face the side of the sound blocking unit 34.

Subsequently, a distance between the sound flow path separator 32 and the sound blocking unit 34 may be maintained at the same distance in the outward direction of the support plate 10 from the sound output unit 20.

In some cases, the distance between the sound flow path separator 32 and the sound blocking unit 34 may gradually increase in the outward direction of the support plate 10 from the sound output unit 20.

In addition, the sound flow path separator 32 is located in the central region of one side edge of the support plate 10 to be separated into the first sound flow path and the second sound flow path.

Figure 6:
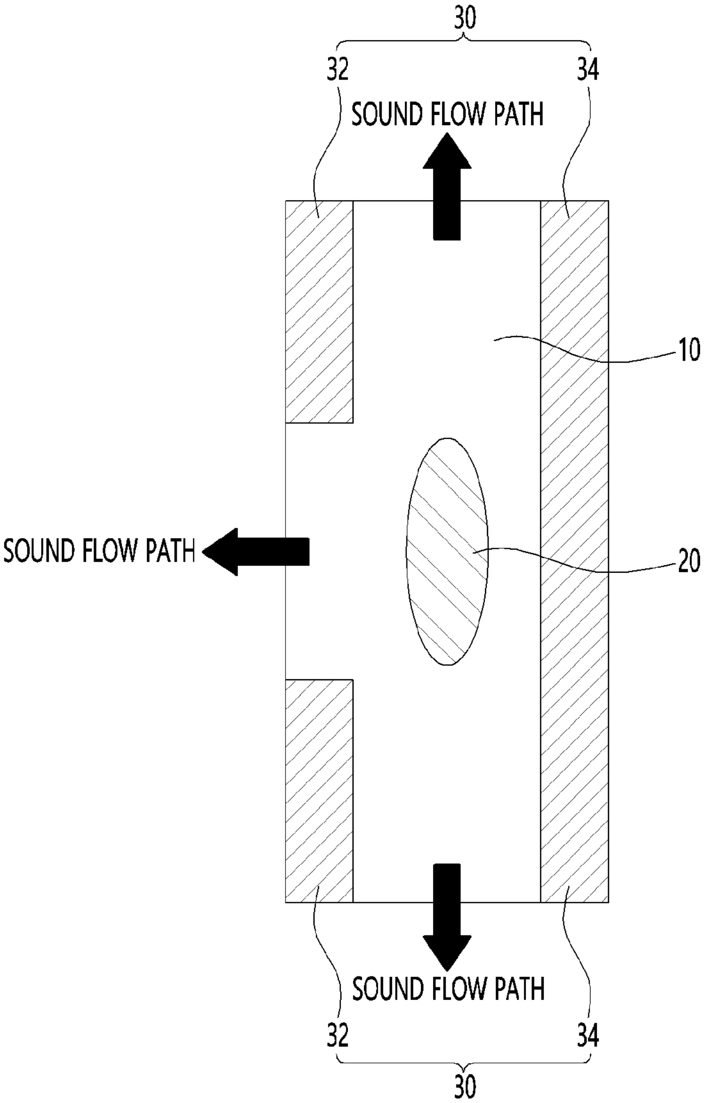
FIG. 6 is a diagram illustrating a speaker module according to another embodiment of the present disclosure.

FIG. 6 is a diagram illustrating a speaker module according to another embodiment of the present disclosure.

As shown in FIG. 6, the speaker module of the present disclosure may include a support plate 10, a sound output unit 20 fixed on an upper surface of the support plate 10, and a guide plate 30 disposed on an upper surface of the support plate 10 and having formed therein three sound flow paths for guiding the output direction of sound output from the sound output unit 20.

Here, three sound flow paths may be formed in the outward direction of the support plate 10 centered on the sound output unit 20.

That is, in the guide plate 30, the first sound flow path, the second sound flow path and the third sound flow path having different directions may be formed.

Here, the first sound flow path may be formed in a first lateral direction of the support plate 10 from the sound output unit 20, the second sound flow path may be formed in a second lateral direction of the support plate 10, which is opposite to the first lateral direction of the support plate 10, from the sound output unit 20, and the third sound flow path may be formed in a third lateral direction of the support plate 10, which is perpendicular to the first lateral direction or second lateral direction of the support plate 10, from the sound output unit 20.

At this time, the first sound flow path and the second sound flow path have the same length and are arranged symmetrically with each other with respect to the sound output unit 20, and the third sound flow path has a length different from that of the first sound flow path or the second sound flow path.

For example, the length of the third sound flow path may be shorter than that of the first sound flow path or the second sound flow path.

Also, the areas of the first sound flow path and the second sound flow path may be the same, and the area of the third sound flow path may be different from that of the first sound flow path or the second sound flow path.

For example, the area of the third sound flow path may be smaller than that of the first sound flow path or the second sound flow path.

In addition, the guide plate 30 includes a sound blocking unit 34 disposed in one region of the support plate 10 based on the sound output unit 20 to block sound directed in one direction, and a sound flow path separator 32 disposed in the other region of the support plate 10 based on the sound output unit 20 to separate the sound flow path.

Here, the sound flow path separator 32 may include two sound flow path separators disposed in a corner region of the other edge of the support plate 10.

Accordingly, the number of sound flow path separators 32 may be determined by an equation of N=n−1 (where N is the number of sound flow path separators and n is the number of sound flow paths).

Figure 7:
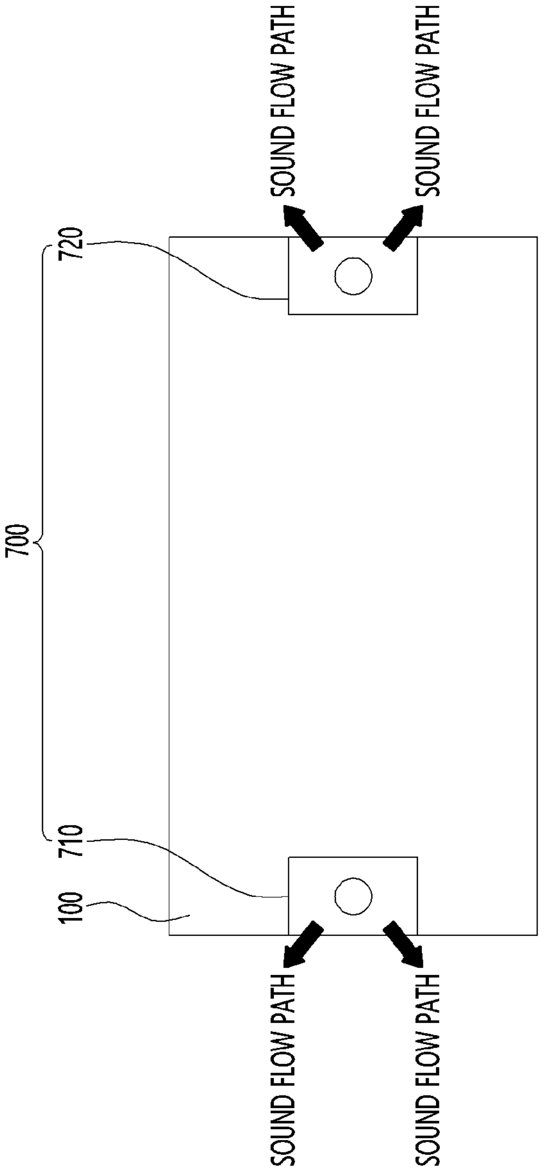
FIGS. 7 and 8 are diagrams illustrating a display device in which two speaker modules having two sound flow paths are mounted.
Figure 8:
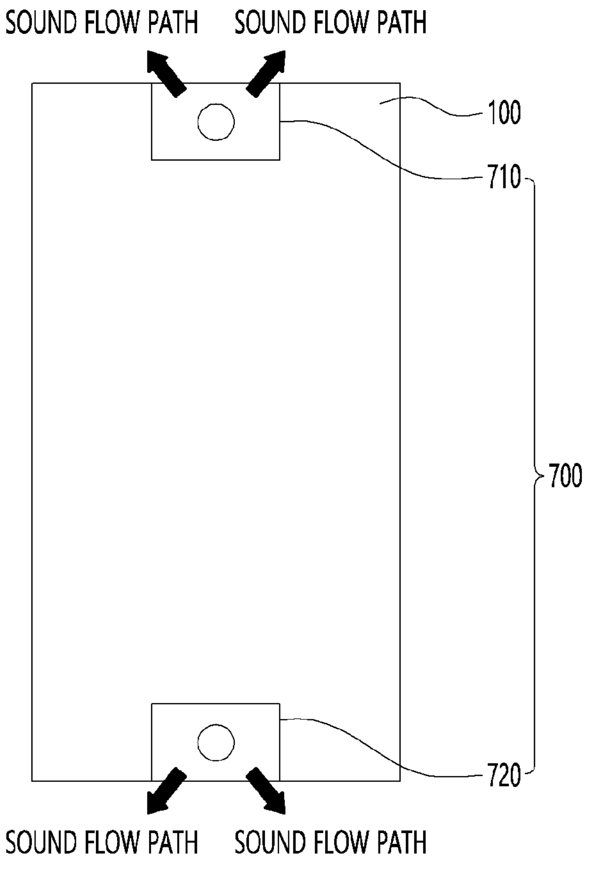
Figure 9:
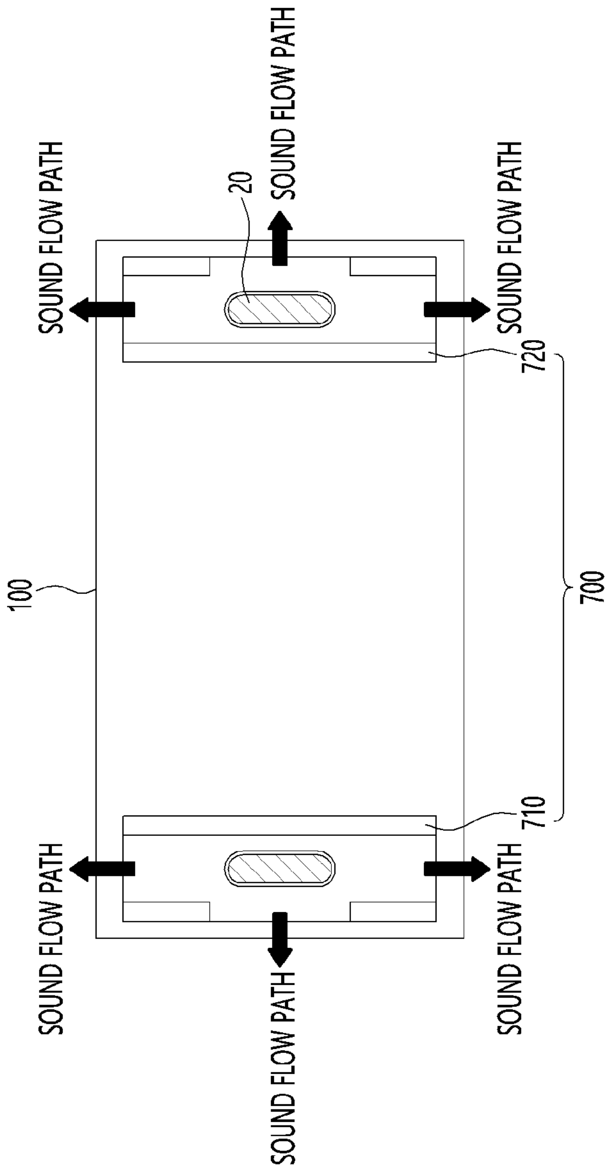
FIG. 9 is a diagram illustrating a display device in which two speaker modules having three sound flow paths are mounted.

FIGS. 7 and 8 are diagrams showing a display device in which two speaker modules having two sound flow paths are mounted, and FIG. 9 is a diagram illustrating a display device in which two speaker modules having three sound flow paths are mounted.

FIGS. 7 to 9 are diagrams illustrating a speaker module mounted in a rotatable display device, FIGS. 7 and 9 are diagrams illustrating sound flow paths of the speaker module when the display device is in a landscape mode, and FIG. 8 is a diagram illustrating the sound flow paths of the speaker module when the display device is in portrait mode.

As shown in FIGS. 7 to 9, a plurality of speaker modules 700 of the present disclosure may be disposed in at least one of the front or rear side of the display device 100, and may be disposed symmetrically with each other with respect to the central region of the display device 100.

Here, in the speaker module 700, a plurality of sound flow paths for guiding a radiation direction of sound output from the sound output unit may be formed.

For example, the speaker module 700 may be located in a circuit driving board cover located at the rear side of the display device 100.

In addition, the speaker module 700 may be symmetrically disposed on the left and right sides or symmetrically disposed on the upper and lower sides, respectively, based on the central region of the display device 100.

As shown in FIGS. 7 and 9, the speaker module 700 includes a first speaker module 710 disposed in a left edge region at the rear side of the display device 100 and a second speaker module 720 disposed in a right edge region at the rear side of the display device 100.

Here, the first speaker module 710 and the second speaker module 720 may be symmetrical to each other with respect to the rear center region of the display device 100.

In addition, as shown in FIG. 8, the speaker module 700 includes a first speaker module 710 disposed in an upper edge region at the rear side of the display device 100 and a second speaker module 720 disposed in a lower edge region at the rear side of the display device 100.

Here, the first speaker module 710 and the second speaker module 720 may be symmetrical to each other with respect to the rear center region of the display device 100.

Figure 10:
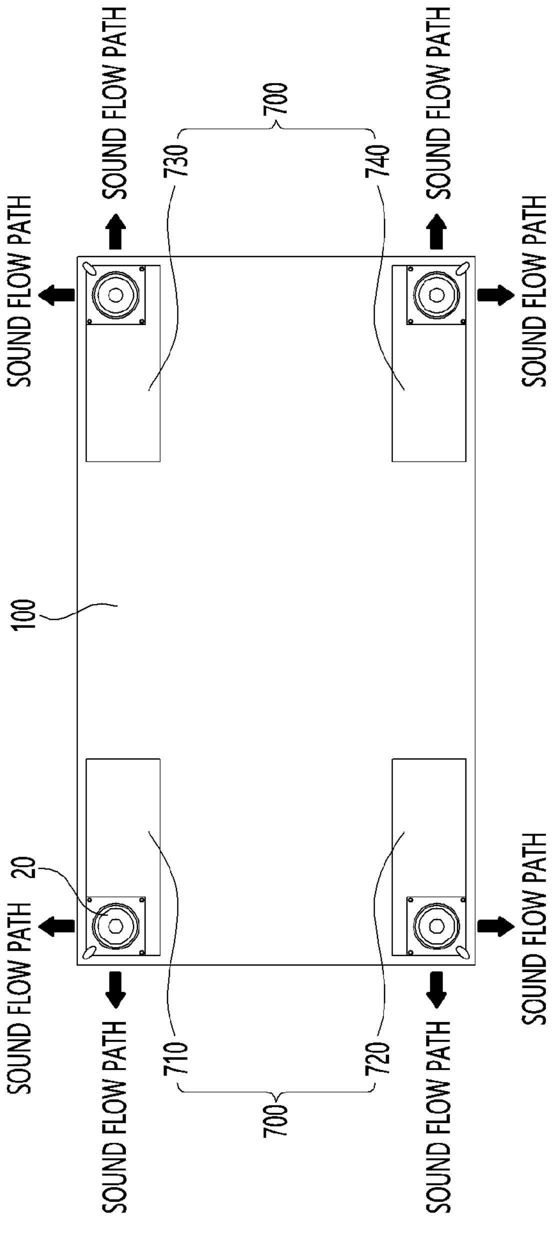
FIG. 10 is a diagram illustrating a display device in which four speaker modules having two sound flow paths are mounted.

FIG. 10 is a diagram illustrating a display device in which four speaker modules having two sound flow paths are mounted.

As shown in FIG. 10, the speaker module 700 includes a first speaker module 710 disposed in an upper corner region of the left edge at the rear side of the display device 100, a second speaker module 720 disposed in a lower corner region of the left edge at the rear side of the display device 100, a third speaker module 730 disposed in an upper corner region of the right edge at the rear side of the display device 100, and a fourth speaker module 740 disposed at a lower corner region of the right edge at the rear side of the display device 100.

Here, the first speaker module 710 and the second speaker module 720, or the third speaker module 730 and the fourth speaker module 740 are symmetrical to each other with respect to a horizontal line passing through the center at the rear side of the display device 100.

Also, the first speaker module 710 and the third speaker module 730, or the second speaker module 720 and the fourth speaker module 740 may be symmetrical to each other with respect to a vertical line passing through the center at the rear side of the display device 100.

Figure 11A:
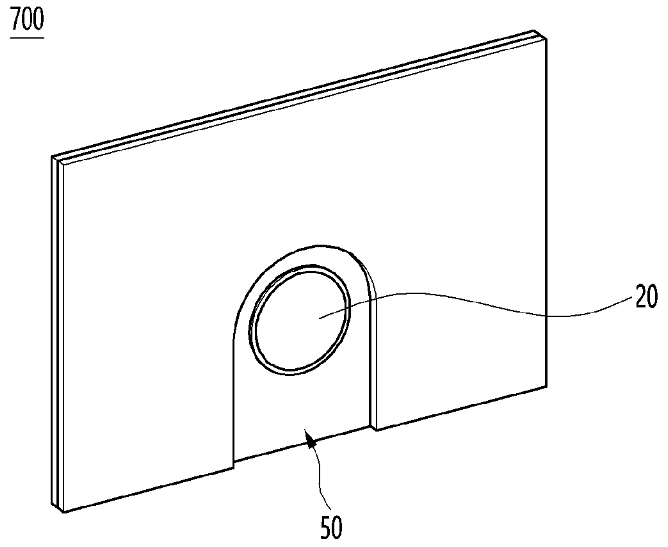
FIGS. 11A to 11C are diagrams illustrating a sound radiation path of a speaker module having one sound flow path.
Figure 11B:
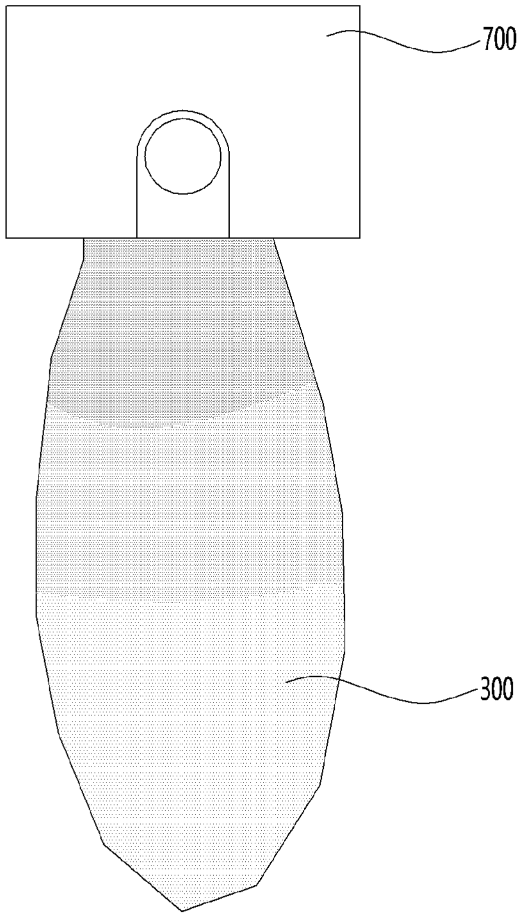
Figure 11C:
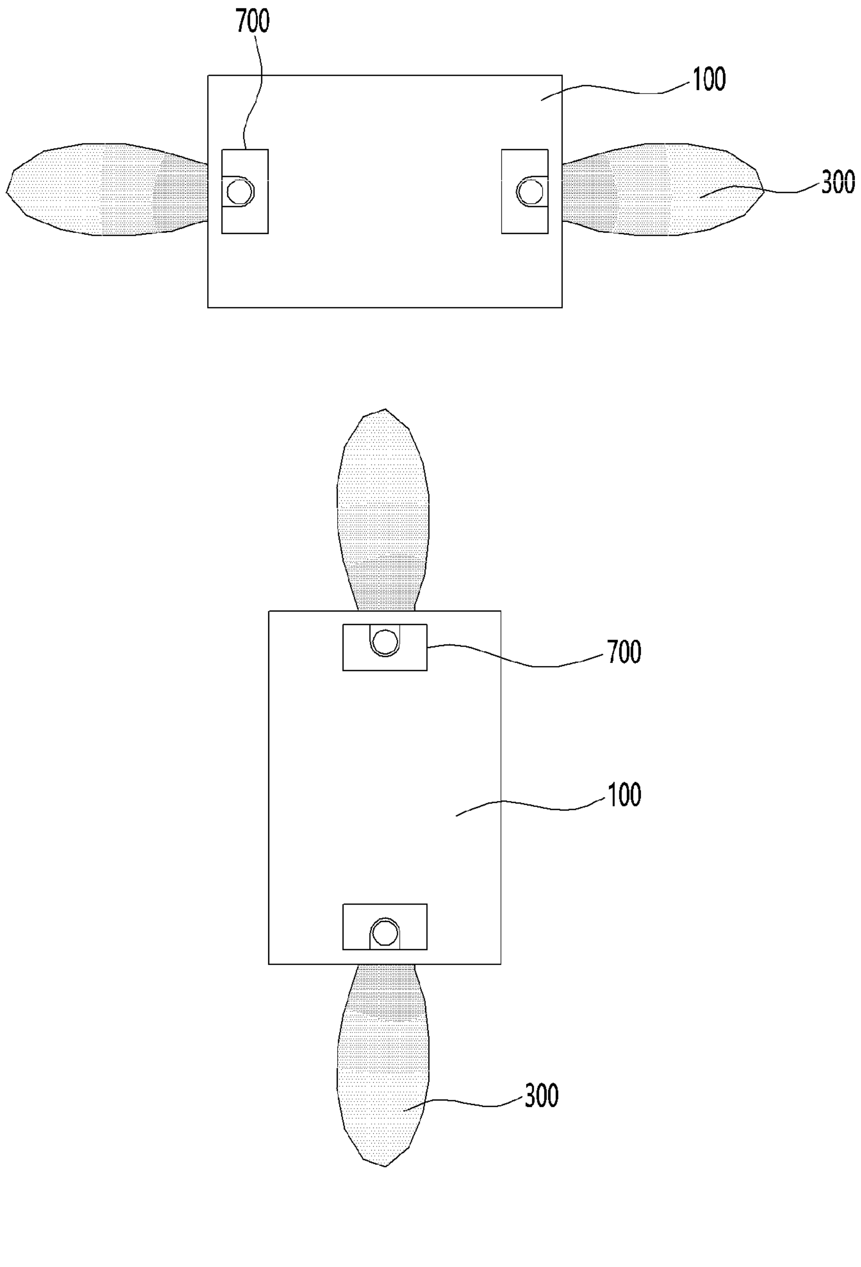
Figure 12A:
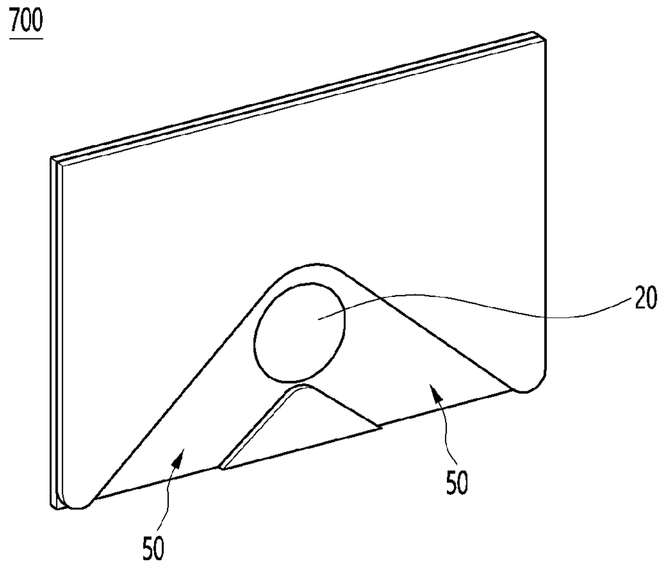
FIGS. 12A to 12C are diagram illustrating a sound radiation path of a speaker module having a plurality of sound flow paths.
Figure 12B:
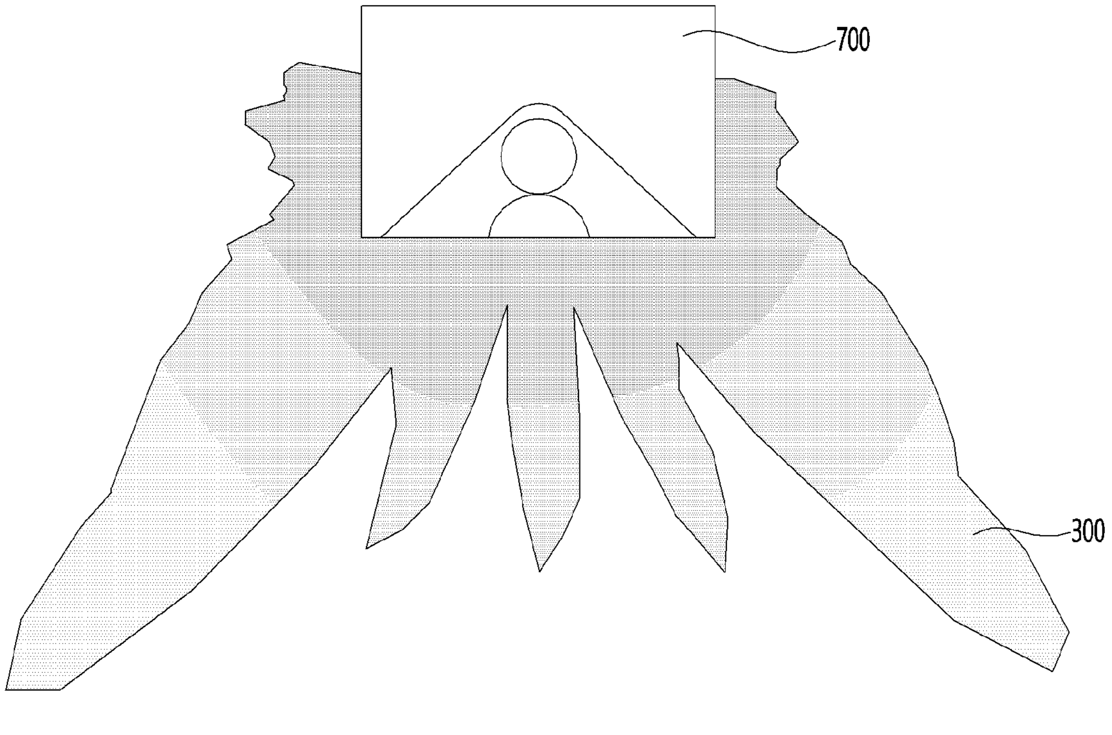
Figure 12C:
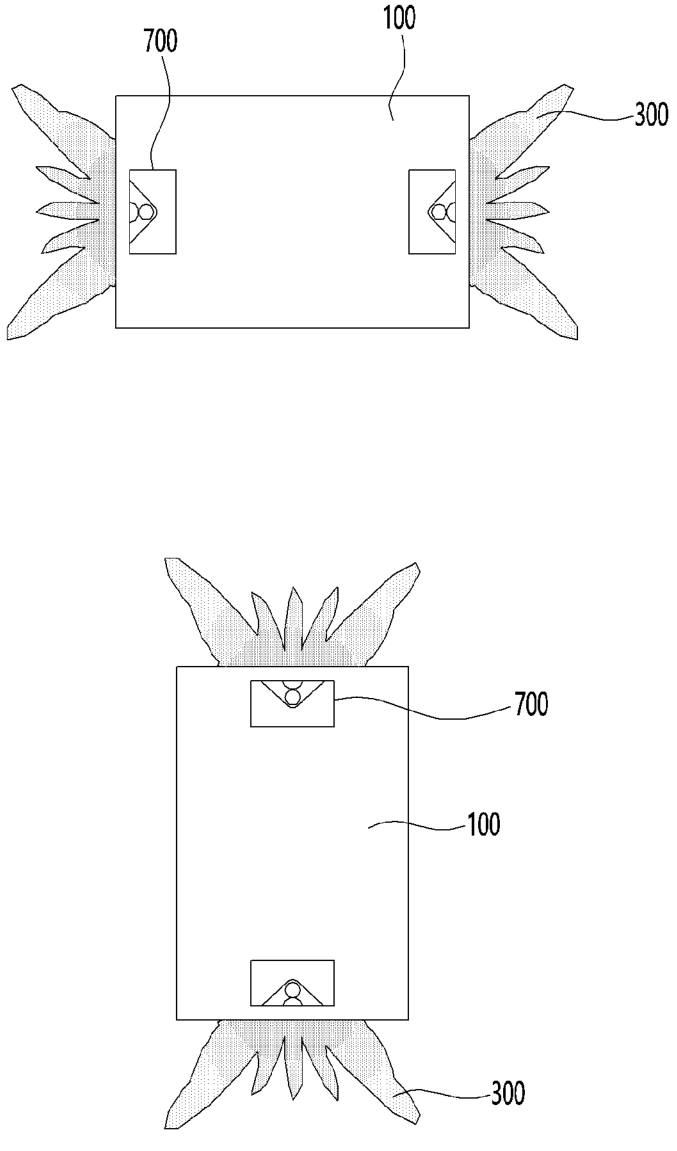

FIGS. 11A to 11C are diagrams illustrating a sound radiation path of a speaker module having one sound flow path, and FIGS. 12A to 12C are diagram illustrating a sound radiation path of a speaker module having a plurality of sound flow paths.

As shown in FIGS. 11A and 11B, it can be seen that, in the speaker module 700 having one sound flow path 50, since the sound radiation path 300 is concentrated in one direction, the sound field effect is reduced.

As shown in FIG. 11C, it can be seen that, when the speaker modules 700 having one sound flow path 50 are mounted in the left edge region and the right edge region of the display device 100, the sound radiation path 300 is formed only in the narrow space region in the left and right directions of the display device 100, thereby reducing the sound field effect.

On the other hand, as shown in FIGS. 12A and 12B, in the speaker module 700 of the present disclosure having a plurality of sound flow paths 50, the sound radiation paths 300 spread in various directions to enhance the sound field effect.

As shown in FIG. 12C, it can be seen that, when the speaker module 700 of the present disclosure having a plurality of sound flow paths 50 is mounted in the left edge region and the right edge region of the display device 100, the sound radiation path 300 is formed only in the wide space region in the left and right directions of the display device 100, thereby enhancing the sound field effect.

Figure 13A:
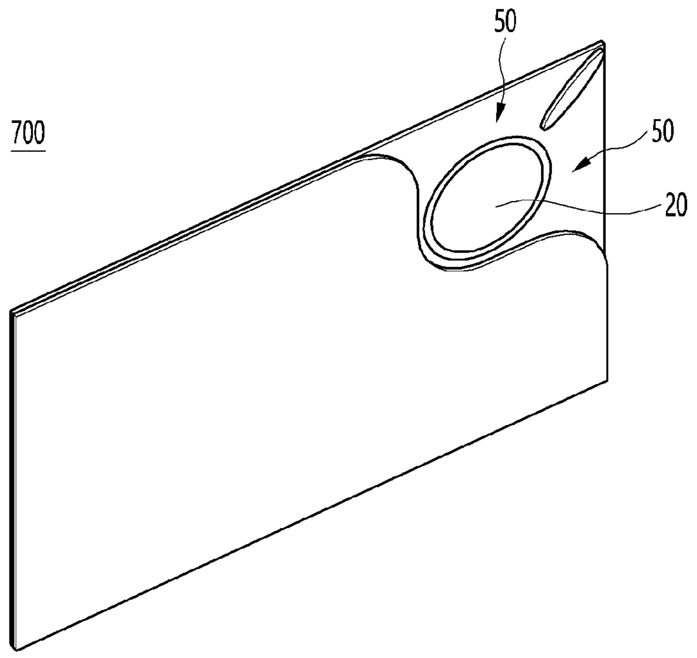
FIGS. 13A and 13B are diagrams illustrating a sound radiation path of a speaker module having a sound flow path having a first shape.
Figure 13B:
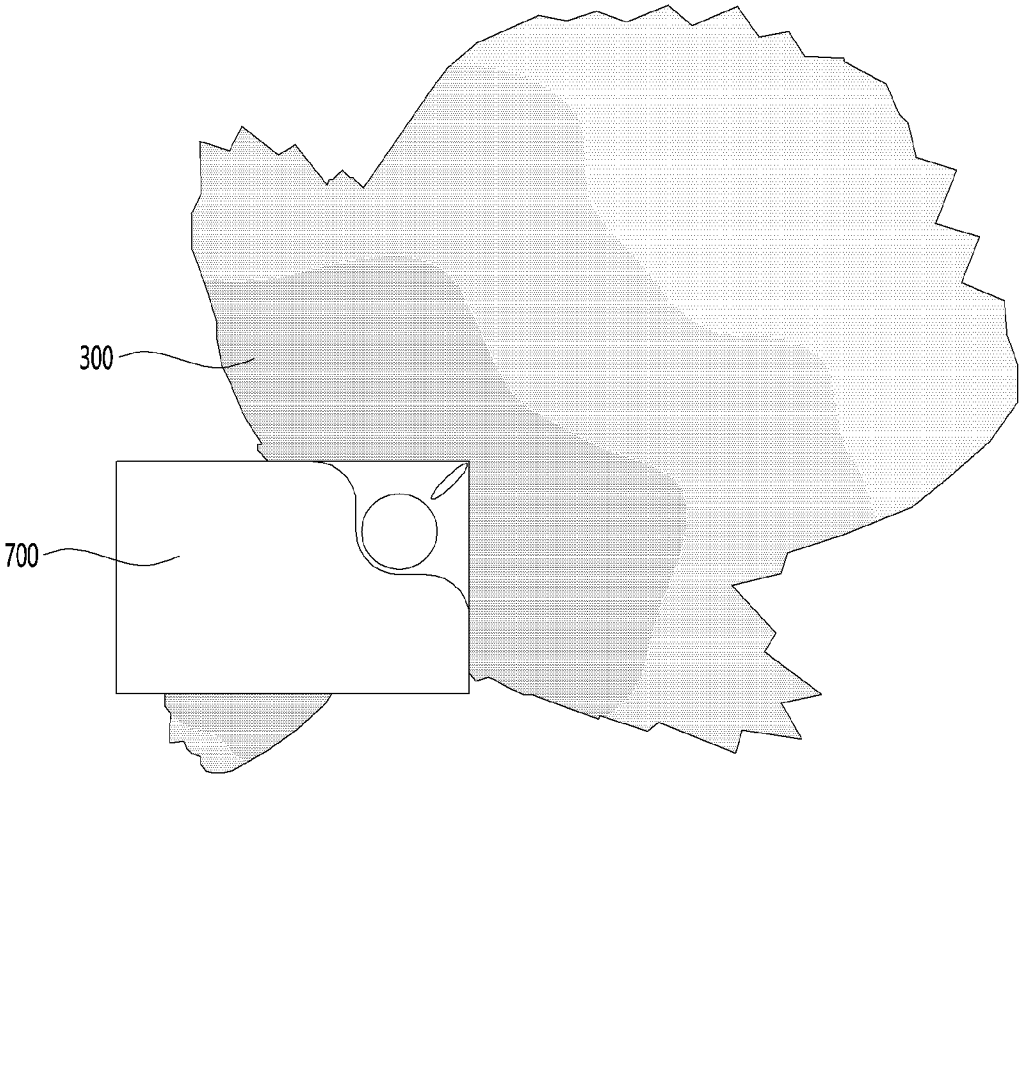
Figure 14A:
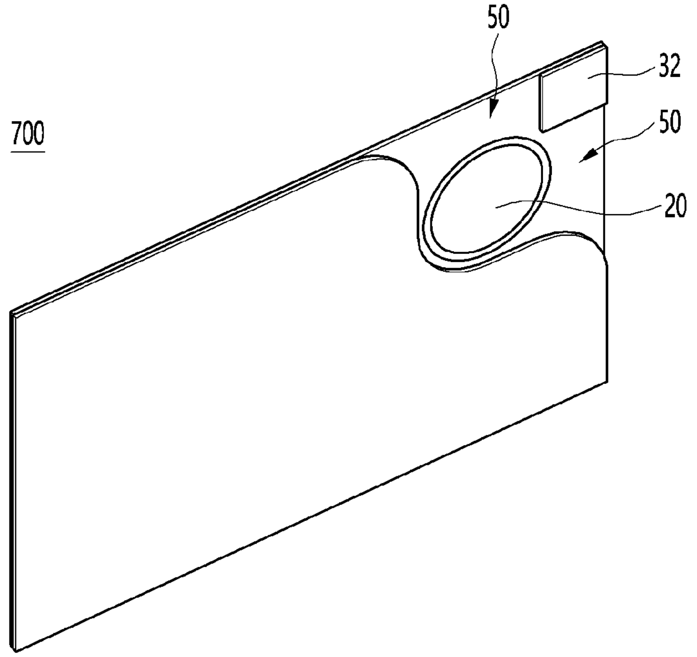
FIGS. 14A and 14B are diagrams illustrating a sound radiation path of a speaker module having a sound flow path having a second shape.
Figure 14B:
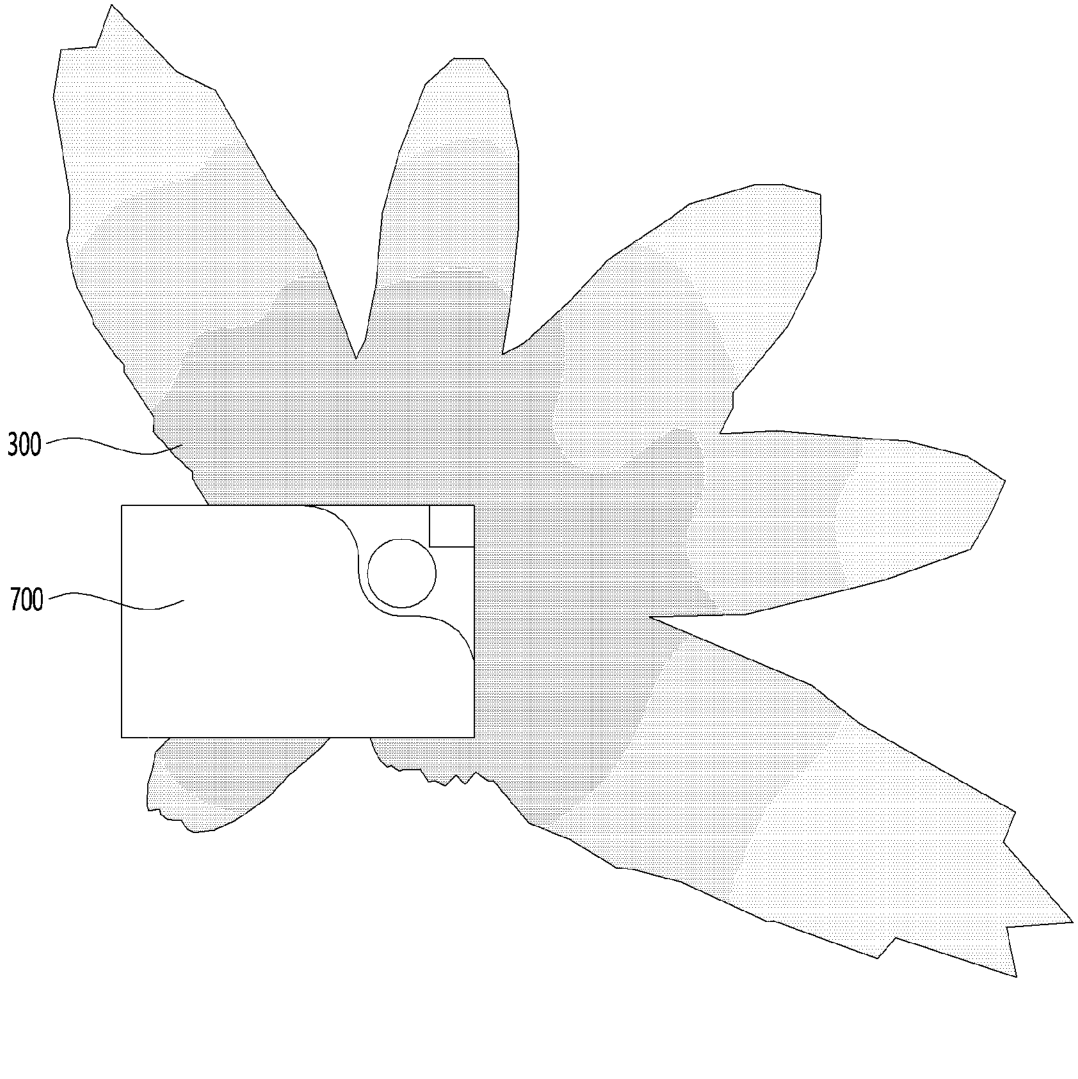
Figure 15A:
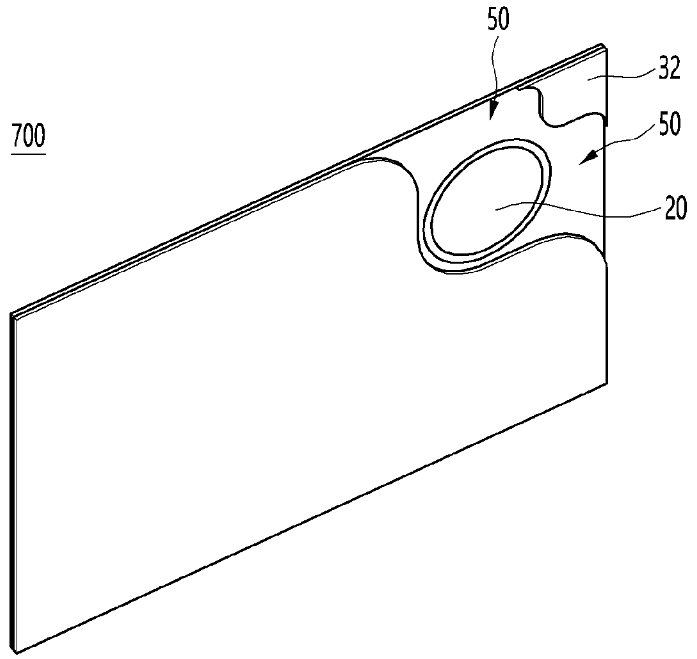
FIGS. 15A and 15B are diagrams illustrating a sound radiation path of a speaker module having a sound flow path having a third shape.
Figure 15B:
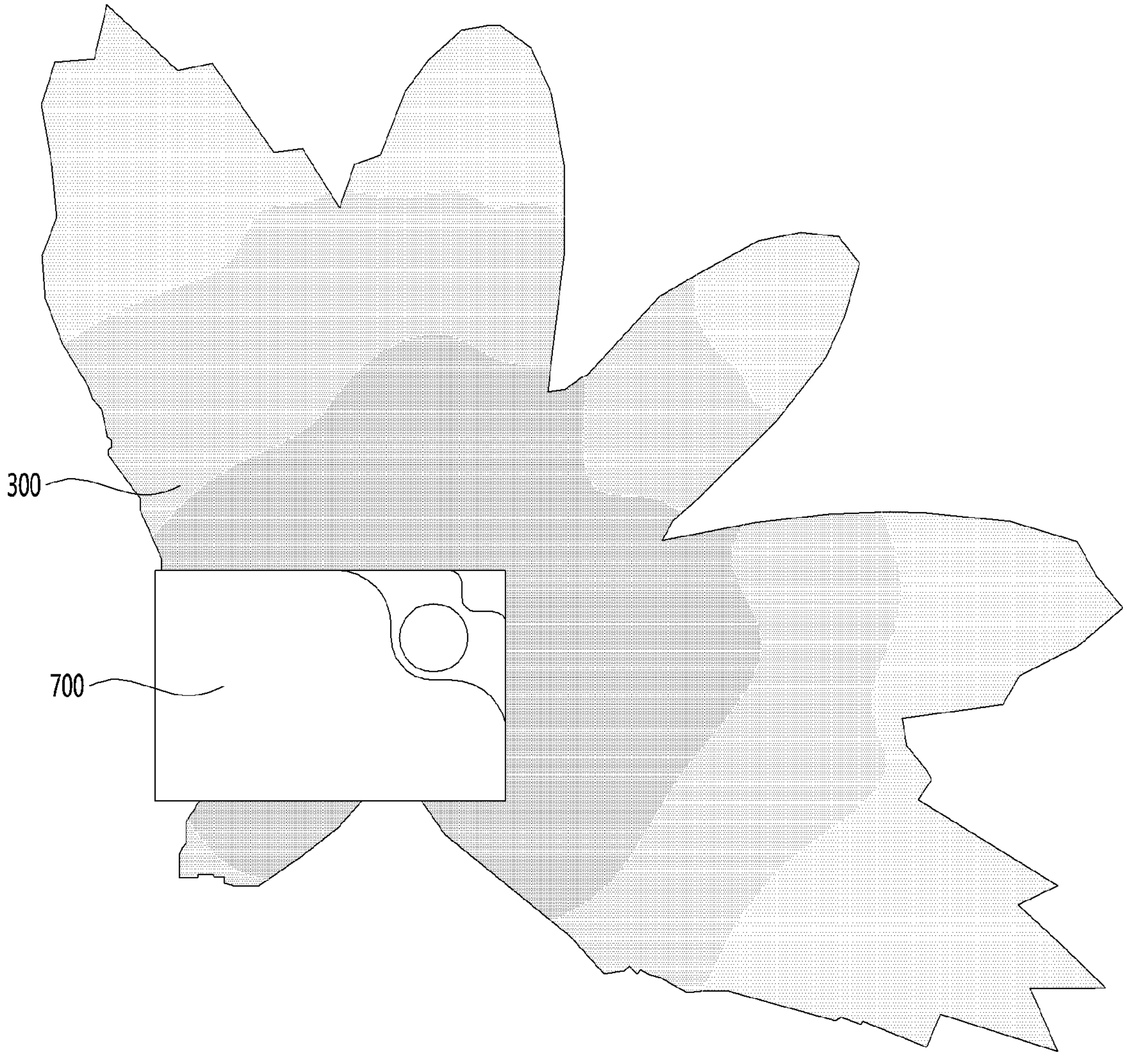
Figure 16:
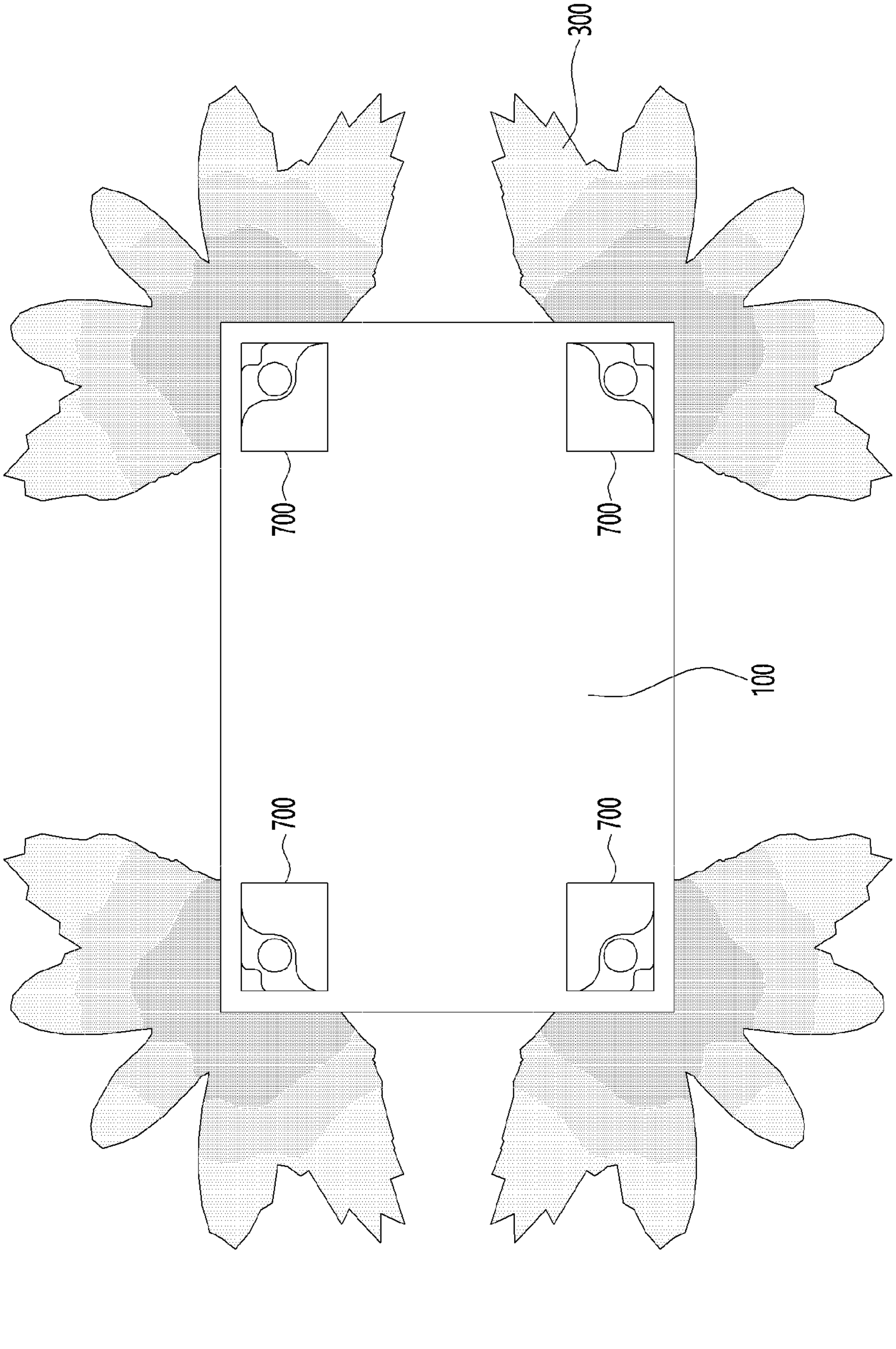
FIG. 16 is a diagram illustrating a sound radiation path of a display device in which four speaker modules having a sound flow path having a third shape is mounted.

FIGS. 13A and 13B are diagrams illustrating a sound radiation path of a speaker module having a sound flow path having a first shape, FIGS. 14A and 14B are diagrams illustrating a sound radiation path of a speaker module having a sound flow path having a second shape, FIGS. 15A and 15B are diagrams illustrating a sound radiation path of a speaker module having a sound flow path having a third shape, and FIG. 16 is a diagram illustrating a sound radiation path of a display device in which four speaker modules having a sound flow path having a third shape is mounted.

In the speaker module 700 of the present disclosure, the sound output unit 20 may be mounted in a corner region of a support plate, which is a speak box back case, and a plurality of sound flow paths 50 for guiding the output direction of sound output from the sound output unit 20 may be formed in a guide plate, which is a speak box front case.

Here, the guide plate may include a sound blocking unit disposed in one region of the support plate based on the sound output unit 20 to block sound directed in one direction, and a sound flow path separator 32 disposed in the other region of the support plate based on the sound output unit 20 to separate the sound flow path.

For example, the shape of the side of the sound blocking unit may have a curved surface or a flat shape depending on the shape of the side of the sound output unit 20.

As another example, sides of the sound blocking unit and the sound flow path separator 32 facing the sound output unit 20 may be formed in at least one of a curved shape or a flat shape.

The shape of the side of the sound blocking unit and the sound flow path separator 32 may be a factor in determining the sound radiation path and the sound field range.

Therefore, the present disclosure can optimize the sound radiation path and the sound field range by optimally designing the shapes of the sides of the sound blocking unit and the sound flow path separator 32 in consideration of the sound output mode of the display device in which the speaker module 700 is mounted.

As shown in FIGS. 13A and 13B, it can be seen that the sound radiation path 300 of the speaker module 700 spreads widely in one direction when the area of the sound flow path separator is small.

In addition, as shown in FIGS. 14A and 14B, it can be seen that, when the shape of the side of the sound flow path separator 32 is a straight shape, the sound radiation path 300 of the speaker module 700 is divided in several directions and spreads widely.

In addition, as shown in FIGS. 15A and 15B, it can be seen that, when the shape of the side of the sound flow path separator 32 is a curved shape, the sound radiation path 300 of the speaker module 700 is divided in several directions and spread to a wider space.

Therefore, as shown in FIG. 16, it can be seen that, when four speaker modules 700 having a sound flow path of a third shape are mounted in the corner region of the display device 100, the sound radiation path 300 of the speaker module 700 is divided in several directions and spreads to a wide space, thereby enhancing the sound field effect.

As such, according to the present disclosure, sound output from one speaker may be radiated in a plurality of directions, so that the sound field effect can be enhanced without increasing the number of speakers.

Figure 17A:
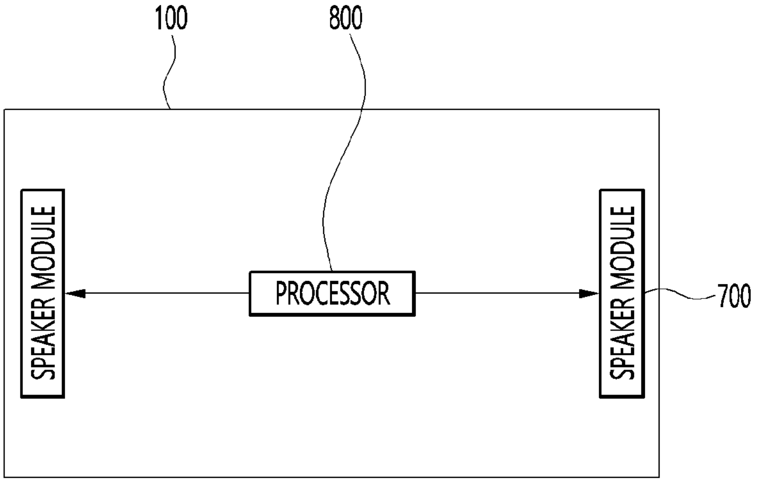
FIGS. 17A and 17B are diagrams illustrating a display device that individually controls sound output of a speaker module according to a sound field mode of content.
Figure 17B:
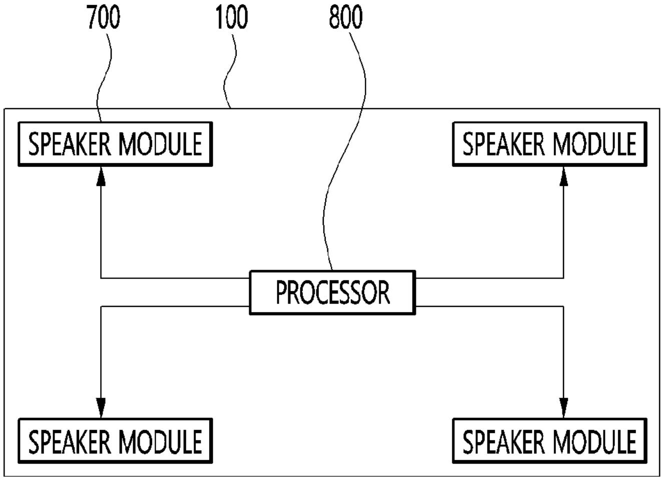

FIGS. 17A and 17B are diagrams illustrating a display device that individually controls sound output of a speaker module according to a sound field mode of content.

As shown in FIGS. 17A and 17B, the display device 100 of the present disclosure may include a speaker module 700, a display unit displaying content, and a processor 800 controlling sound output of the speaker module 700.

Here, the speaker module 700 may include a support plate, a sound output unit fixed on an upper surface of the support plate, a guide plate disposed on an upper surface of the support plate and having formed therein a sound flow path for guiding an output direction of sound output from the sound output unit, and a cover plate covering the sound flow path.

In this case, a plurality of sound flow paths of the speaker module 700 may be formed in an outward direction of the support plate based on the sound output unit.

In addition, the processor 800 may individually control the sound output of the plurality of speaker modules according to the sound field mode of the content displayed on the display unit, and adjust the sound radiated to the outside along the sound flow path of each speaker module.

For example, when the sound field mode of the content is a stadium mode in which sports are in progress, the processor 800 controls all sound outputs to the four speaker modules as shown in FIG. 17 and controls a sound radiation path to spread sound to a wide space.

Figure 18:
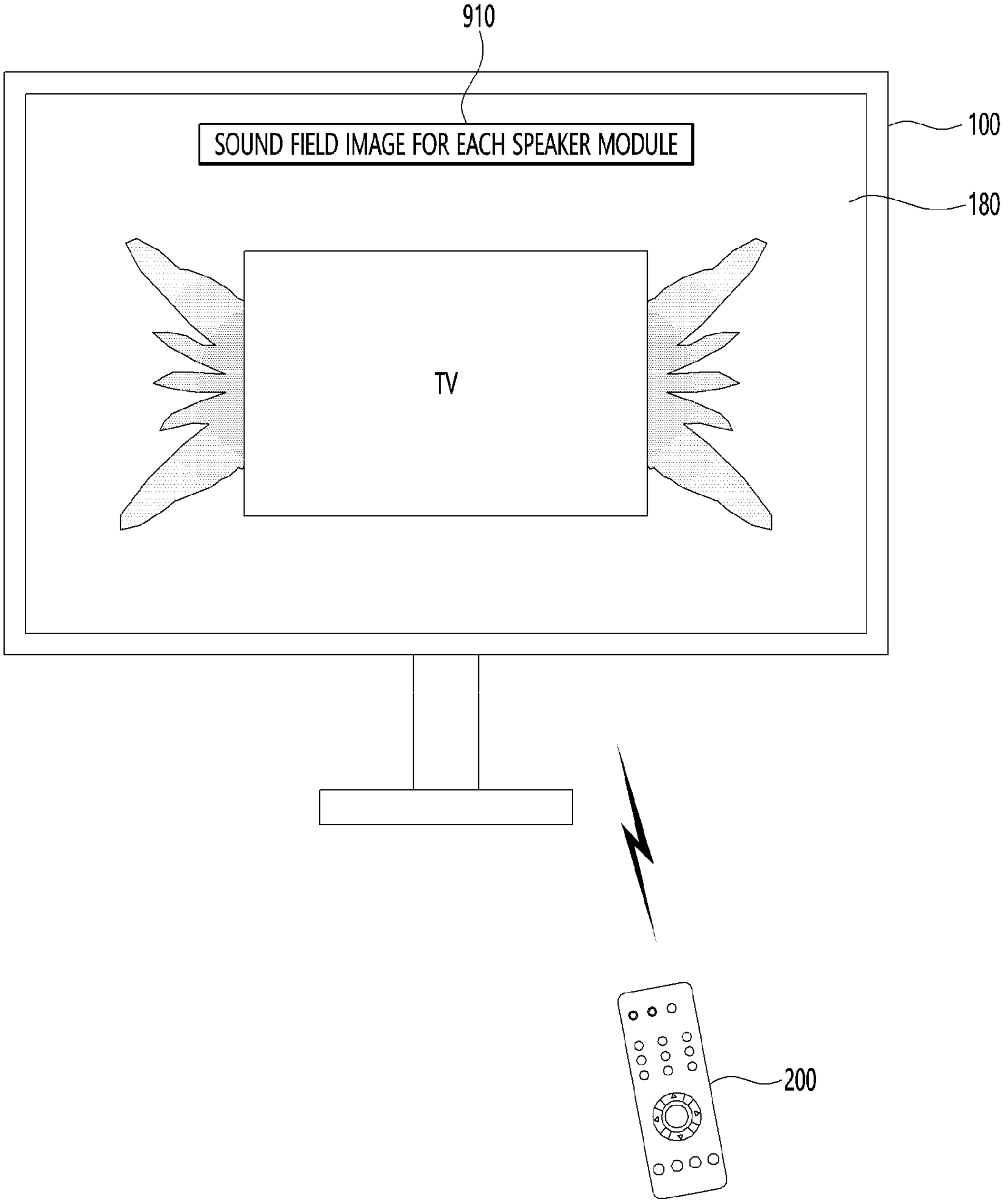
FIGS. 18 and 19 are diagrams illustrating a display device for visualizing a sound radiation path for each speaker module.
Figure 19:
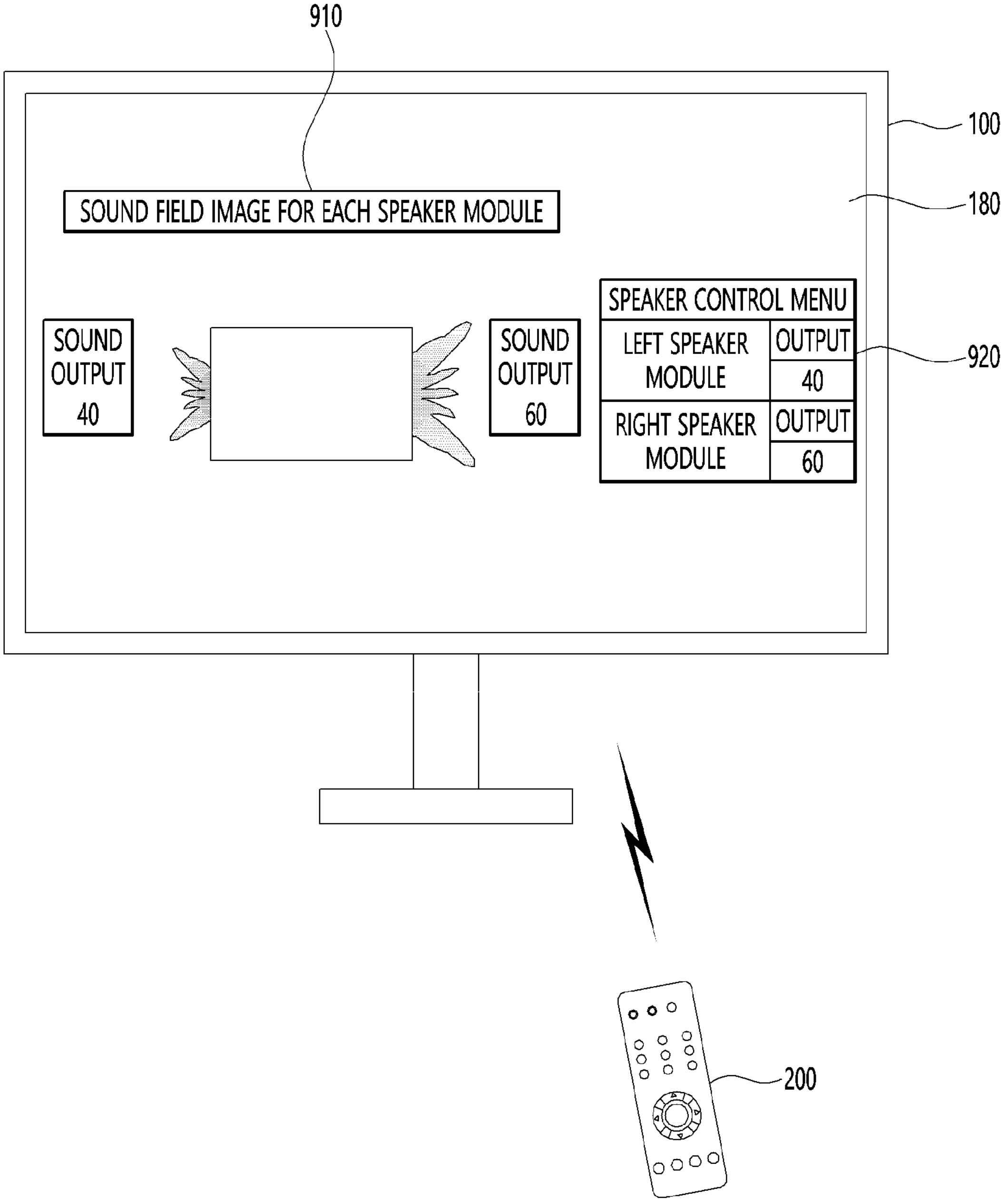

FIGS. 18 and 19 are diagrams illustrating a display device for visualizing a sound radiation path for each speaker module.

As shown in FIGS. 18 and 19, in the present disclosure, a sound field image 910 for each speaker module that visualizes the sound radiation path for each speaker module may be displayed on a screen 180 of the display device 100, when the sound radiation path radiated to the outside along the sound flow path of each speaker module is adjusted.

Further, in the present disclosure, as shown in FIG. 19, a user control menu 920 for each speaker module is provided when a sound field image 910 for each speaker module is displayed, and, when the sound output is adjusted for each speaker module through the user control menu 920 for each speaker module, the sound field image 910 for each speaker module corresponding thereto may be modified and displayed.

In addition, according to the present disclosure, when a sound radiation path radiated to the outside along the sound flow path of each speaker module is adjusted, a user inquiry message asking whether to display a sound field image for each speaker module is displayed on the screen 180 of the display device 100, and a sound field image 910 for each speaker module that visualizes a sound radiation path for each speaker module in correspondence with user input selected through the user inquiry message may be displayed on the screen 180 of the display device 100.

In addition, according to the present disclosure, the sound field image 910 for each speaker module and the user control menu 920 for each speaker module may be provided through user input for manipulating the remote control device 200.

As such, according to the present disclosure, by forming a plurality of sound flow paths in one speaker module, it is possible to radiate sound output from one speaker in a plurality of directions, thereby enhancing the sound field effect without increasing the number of speakers.

Figure 20:
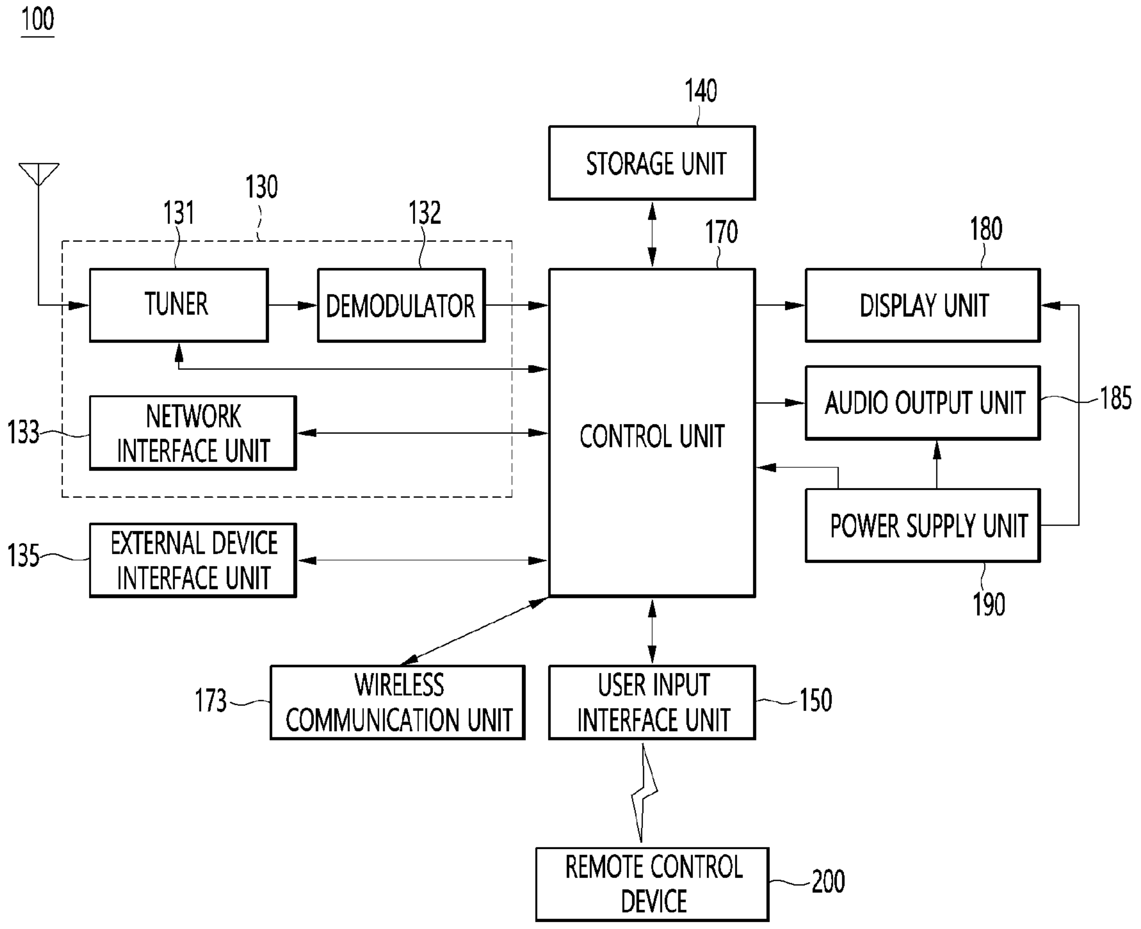
FIG. 20 is a block diagram illustrating a configuration of a display device according to an embodiment of the present disclosure.

FIG. 20 is a block diagram illustrating a configuration of a display device according to an embodiment of the present disclosure.

Referring to FIG. 20, a display device 100 may include a broadcast reception module 130, an external device interface unit 135, a storage unit 140, a user input unit 150, a control unit 170, a wireless communication interface unit 173, a display unit 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface unit 133 may access a predetermined webpage through an accessed network or another network linked to the accessed network. That is, the network interface unit 133 may transmit or receive data to or from a corresponding server by accessing a predetermined webpage through the network.

The network interface unit 133 may receive content or data provided from a content provider or a network operator. That is, the network interface unit 133 may receive content, such as movies, advertisements, games, VODs, and broadcast signals, which are provided from the content provider or the network operator, and information relating thereto through the network.

In addition, the network interface unit 133 may receive firmware update information and update files provided from the network operator, and may transmit data to the Internet or content provider or the network operator.

The network interface 133 may select and receive a desired application among applications open to the air, through network.

The external device interface unit 135 may receive an application or an application list in an adjacent external device and deliver the application or the application list to the control unit 170 or the storage unit 140.

The external device interface unit 135 may provide a connection path between the display device 100 and an external device. The external device interface unit 135 may receive at least one of an image or audio outputted from an external device that is wirelessly or wiredly connected to the display device 100 and deliver the received image or the audio to the controller. The external device interface unit 135 may include a plurality of external input terminals. The plurality of external input terminals may include an RGB terminal, at least one High Definition Multimedia Interface (HDMI) terminal, and a component terminal.

An image signal of an external device inputted through the external device interface unit 135 may be outputted through the display unit 180. A sound signal of an external device inputted through the external device interface unit 135 may be outputted through the audio output unit 185.

An external device connectable to the external device interface unit 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control unit 170.

In addition, the storage unit 140 may perform a function for temporarily storing image, voice, or data signals output from the external device interface unit 135 or the network interface unit 133, and may store information on a predetermined image through a channel memory function.

The storage unit 140 may store an application or an application list input from the external device interface unit 135 or the network interface unit 133.

The display device 100 may play content files (e.g., video files, still image files, music files, document files, application files, etc.) stored in the storage unit 140, and may provide the content files to a user.

The user input unit 150 may transmit signals input by a user to the control unit 170, or may transmit signals from the control unit 170 to a user. For example, the user input unit 150 may receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR communication methods.

In addition, the user input unit 150 may transmit, to the control unit 170, control signals input from local keys (not shown) such as a power key, a channel key, a volume key, and a setting key.

Image signals that are image-processed by the control unit 170 may be input to the display unit 180 and displayed as images corresponding to the image signals. In addition, image signals that are image-processed by the control unit 170 may be input to an external output device through the external device interface unit 135.

Voice signals processed by the control unit 170 may be output to the audio output unit 185. In addition, voice signals processed by the control unit 170 may be input to the external output device through the external device interface unit 135.

Additionally, the control unit 170 may control overall operations of the display device 100.

In addition, the control unit 170 may control the display device 100 by a user command or an internal program input through the user input unit 150, and may access the network to download a desired application or application list into the display device 100.

The control unit 170 may output channel information selected by a user together with the processed image or voice signals through the display unit 180 or the audio output unit 185.

In addition, the control unit 170 may output image signals or voice signals of an external device such as a camera or a camcorder, which are input through the external device interface unit 135, through the display unit 180 or the audio output unit 185, according to an external device image playback command received through the user input unit 150.

Moreover, the control unit 170 may control the display unit 180 to display images, and may control the display unit 180 to display broadcast images input through the tuner 131, external input images input through the external device interface unit 135, images input through the network interface unit, or images stored in the storage unit 140. In this case, an image displayed on the display unit 180 may be a still image or video and also may be a 2D image or a 3D image.

Additionally, the control unit 170 may play content stored in the display device 100, received broadcast content, and external input content input from the outside, and the content may be in various formats such as broadcast images, external input images, audio files, still images, accessed web screens, and document files.

Moreover, the wireless communication unit 173 may perform wired or wireless communication with an external device. The wireless communication unit 173 may perform short-range communication with an external device. For this, the wireless communication unit 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication unit 173 may detect (or recognize) a wearable device capable of communication around the display device 100. Furthermore, if the detected wearable device is a device authenticated to communicate with the display device 100, the control unit 170 may transmit at least part of data processed in the display device 100 to the wearable device through the wireless communication unit 173. Therefore, a user of the wearable device may use the data processed by the display device 100 through the wearable device.

The voice acquisition unit 175 may acquire audio. The voice acquisition unit 175 may include at least one microphone (not shown) and may acquire audio around the display device 100 through the microphone (not shown).

The display unit 180 may convert image signals, data signals, or on-screen display (OSD) signals, which are processed in the control unit 170, or images signals or data signals, which are received in the external device interface unit 135, into R, G, and B signals to generate driving signals.

Furthermore, the display device 100 shown in FIG. 20 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 20, the display device 100 may receive images through the network interface unit 133 or the external device interface unit 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 20, an image processing device such as the separated set-top box, and a content playback device including the display unit 180 and the audio output unit 185.

The audio output unit 185 receives the audio-processed signal from the control unit 170 to output an audio signal.

The power supply unit 190 supplies the corresponding power to the entire display device 100. Particularly, power may be supplied to the control unit 170 that is capable of being implemented in the form of a system on chip (SOC), the display unit 180 for displaying an image, the audio output unit 185 for outputting audio, and the like.

Specifically, the power supply unit 190 may include a converter that converts AC power to DC power and a DC/DC converter that converts a level of the DC power.

According to an embodiment of the present disclosure, a speaker module and a display device including the same can radiate sound output from one speaker in a plurality of directions by forming a plurality of sound flow paths in one speaker module and enhance a sound field effect without increasing the number of speakers.

The present disclosure described above can be implemented as computer readable codes in a medium on which a program is recorded. A computer-readable medium includes all types of recording devices in which data that can be read by a computer system is stored. Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. Also, the computer may include a processor of an artificial intelligence device.

What is claimed is:

1. A speaker module comprising:

a support plate;

a sound output unit fixed on an upper surface of the support plate;

a guide plate disposed on an upper surface of the support plate and having formed therein a sound flow path for guiding an output direction of sound output from the sound output unit; and a cover plate covering the sound flow path, wherein a plurality of sound flow paths is formed in an outward direction of the support plate centered on the sound output unit, wherein the guide plate forms the plurality of sound flow paths with different directions centered on the sound output unit, and the plurality of sound flow paths include sound flow paths having the same length and arranged symmetrically with each other.

2. The speaker module of claim 1, wherein the guide plate comprises:

a sound blocking unit disposed in one region of the support plate based on the sound output unit to block sound directed in one direction; and a sound flow path separator disposed in an other region of the support plate based on the sound output unit to separate the sound flow path.

3. The speaker module of claim 2, wherein the sound blocking unit is disposed spaced apart from the sound output unit and the sound flow path separator, and wherein a shape of a side of the sound blocking unit varies according to a shape of a side of the sound output unit.

4. The speaker module of claim 2, wherein sides of the sound blocking unit and the sound flow path separator facing the sound output unit are formed in at least one of a curved shape or a flat shape.

5. The speaker module of claim 2, wherein the number of sound flow path separators is determined by an equation of N=n−1 (where, N is the number of sound flow path separators and n is the number of sound flow paths).

6. The speaker module of claim 2, wherein the sound flow path separator is located in at least one of a central region or a corner region of one edge of the support plate.

7. The speaker module of claim 1, wherein the speaker module of claim 1, wherein, in the guide plate, a first sound flow path and a second sound flow path having different directions are formed, wherein the first sound flow path is formed in a left diagonal direction of one side of the support plate from the sound output unit, wherein the second sound flow path is formed in a right diagonal direction of one side of the support plate from the sound output unit, and wherein the first sound flow path and the second sound flow path have the same length and are arranged symmetrically with each other with respect to the sound output unit.

8. The speaker module of claim 1, wherein, in the guide plate, a first sound flow path, a second sound flow path and a third sound flow path having different directions are formed, wherein the first sound flow path is formed in a first lateral direction of the support plate from the sound output unit, wherein the second sound flow path is formed in a second lateral direction of the support plate, which is opposite to the first lateral direction of the support plate, from the sound output unit, wherein the third sound flow path is formed in a third lateral direction of the support plate, which is perpendicular to the first lateral direction or the second lateral direction of the support plate, from the sound output unit, wherein the first sound flow path and the second sound flow path have the same length and are arranged symmetrically with each other with respect to the sound output unit, and wherein the third sound flow path has a length different from that of the first sound flow path or the second sound flow path.

9. The speaker module of claim 1, wherein the cover plate is fastened to come into contact with a side of the guide plate to cover the sound flow path.

10. A display device comprising:

a speaker module;

a display configured to display content; and a processor configured to control sound output of the speaker module, wherein the speaker module comprises:

a support plate;

a sound output unit fixed on an upper surface of the support plate;

a guide plate disposed on an upper surface of the support plate and having formed therein a sound flow path for guiding an output direction of sound output from the sound output unit; and a cover plate covering the sound flow path, wherein a plurality of sound flow paths is formed in an outward direction of the support plate centered on the sound output unit, wherein the guide plate forms the plurality of sound flow paths with different directions centered on the sound output unit, and the plurality of sound flow paths include sound flow paths having the same length and arranged symmetrically with each other.

11. The display device of claim 10, wherein a plurality of speaker modules is disposed on at least one of a front or rear side of the display and is arranged symmetrically with each other with respect to a central region of the display.

12. The display device of claim 11, wherein the speaker modules are disposed symmetrically on left and right sides or upper and lower sides based on a central region of the display.

13. The display device of claim 11, wherein the speaker module comprises:

a first speaker module disposed in an upper corner region of a left edge of the display;

a second speaker module disposed in a lower corner region of the left edge of the display;

a third speaker module disposed in an upper corner region of a right edge of the display; and a fourth speaker module disposed in a lower corner region of the right edge of the display, wherein the first speaker module and the second speaker module or the third speaker module and the fourth speaker module are symmetrical with each other with respect to a horizontal line passing through a center of the display, wherein the first speaker module and the third speaker module or the second speaker module and the fourth speaker module are symmetrical with each other with respect to a vertical line passing through a center of the display.

14. The display device of claim 10, wherein the processor adjusts a sound radiation path radiated to an outside along a sound flow path of each of a plurality of speaker modules by individually controlling sound output of the plurality of speaker modules according to a sound field mode of content displayed on the display.

15. The display device of claim 14, wherein the processor displays a sound field image for each speaker module that visualizes a sound radiation path for each speaker module on a screen of the display when the sound radiation path radiated to the outside along the sound flow path of each of the plurality of speaker modules is adjusted.

* * * * *